US011936131B2

(12) United States Patent
Grek et al.

(10) Patent No.: US 11,936,131 B2
(45) Date of Patent: Mar. 19, 2024

(54) SEALED ELECTRICAL CONNECTOR

(71) Applicant: Amphenol Corporation, Wallingford, CT (US)

(72) Inventors: Joachim Grek, Katrineholm (SE); Kyle Christopher Elmes, Hopewell Junction, NY (US)

(73) Assignee: Amphenol Corporation, Wallingford, CT (US)

( * ) Notice: Subject to any disclaimer, the term of this patent is extended or adjusted under 35 U.S.C. 154(b) by 196 days.

(21) Appl. No.: 17/478,378

(22) Filed: Sep. 17, 2021

(65) Prior Publication Data

US 2022/0085546 A1 Mar. 17, 2022

Related U.S. Application Data

(60) Provisional application No. 63/079,902, filed on Sep. 17, 2020.

(51) Int. Cl.
*H01R 13/52* (2006.01)
*H01R 13/436* (2006.01)
(Continued)

(52) U.S. Cl.
CPC ....... *H01R 13/5221* (2013.01); *H01R 13/436* (2013.01); *H01R 13/4362* (2013.01);
(Continued)

(58) Field of Classification Search
CPC .............. H01R 13/5221; H01R 13/436; H01R 2201/26; H01R 13/639; H01R 13/6272;
(Continued)

(56) References Cited

U.S. PATENT DOCUMENTS

2002/0123257 A1* 9/2002 Matsuoka .......... H01R 13/4361 439/271
2017/0077636 A1 3/2017 Nagasawa
2018/0366843 A1 12/2018 Maki

FOREIGN PATENT DOCUMENTS

DE 10223235 A1 * 1/2003 ......... H01R 13/4362
EP 0691709 A2 * 1/1996
EP 3220483 A1 9/2017

OTHER PUBLICATIONS

Machine Translation of EP-0691709-A2, (Jan. 10, 1996) (Year: 2023).*

(Continued)

*Primary Examiner* — Travis S Chambers
(74) *Attorney, Agent, or Firm* — CANTOR COLBURN LLP

(57) ABSTRACT

A sealed electrical connector that includes an interface component that has housing with a front end and an opposite rear end, the front end has an open end face for receiving a mating connector, and the rear end for receiving cable. The housing has contacts. A terminal-position-assurance feature is coupled to the contacts and to the housing. The terminal-position-assurance feature may be located at a first axial position along the longitudinal axis of the housing which is a first distance from the open end face of the housing. An interface seal surrounds an outer portion of the housing. The interface seal is located on the housing at a second axial position along the longitudinal axis of the housing which is a second distance from the open end face of the housing. The second distance is greater than the first distance.

25 Claims, 8 Drawing Sheets

(51) Int. Cl.
*H01R 13/627* (2006.01)
*H01R 13/639* (2006.01)

(52) U.S. Cl.
CPC ..... *H01R 13/5219* (2013.01); *H01R 13/6272* (2013.01); *H01R 13/639* (2013.01); *H01R 2201/26* (2013.01)

(58) Field of Classification Search
CPC H01R 24/50; H01R 13/4362; H01R 13/5208; H01R 13/5219
See application file for complete search history.

(56) References Cited

OTHER PUBLICATIONS

Machine Translation of DE-10223235-A1, (Jan. 9, 2003) (Year: 2023).*
International Search Report for International Application No. PCT/US2021/050950; International Filing Date: Sep. 17, 2021; dated Mar. 16, 2022; 6 pages.
Written Opinion for International Application No. PCT/US2021/050950; International Filing Date: Sep. 17, 2021; dated Mar. 16, 2022; 17 pages.

* cited by examiner

SEALED ELECTRICAL CONNECTOR

CROSS-REFERENCE TO RELATED APPLICATION

This application claims the benefit of priority of U.S. Provisional Application Ser. No. 63/079,902 filed on Sep. 17, 2020 and entitled "Sealed Electrical Connector," the content of which is relied upon and incorporated herein by reference in its entirety.

BACKGROUND

The present disclosure relates generally to the field of electrical connectors and more particularly to a sealed RF electrical connector configured for high density and high frequency applications.

Electrical connectors have a wide range of applications, including applications in radio-frequency (RF) interconnect systems. For example, automobiles have an increasing need for radio-frequency (RF) interconnect systems to support new technologies and applications. Challenges remain, however, for electrical connectors to meet needs for, e.g., higher density, higher frequency, smaller dimensions, and/or compatibility with various technologies and applications. For example, next generation RF interconnect systems require increased channels and higher data bandwidth, which in turn require smaller, higher density and higher frequency RF connectors. Automobiles, for example, have an increasing need for RF interconnect to support new technologies, such as autonomous driving, 5G wireless networks, and V2X communications. The current automobile industry interface standard "FAKRA" or "mini-FAKRA" is limiting based on size and frequency range of the connector. These limitations make it difficult to environmentally seal a mini-FAKRA connector because, for example, sealing such a connector can increase the overall diameter of the connector which limits its ability to pass through openings/holes in an automotive chassis.

SUMMARY

An aspect of this disclosure relates to a sealed electrical connector that comprises an interface component that has a housing with a front end and an opposite rear end. The front end has an open end face configured to receive a mating connector and the rear end is configured to receive one or more cables. The housing comprises one or more contacts. A terminal-position-assurance feature may be coupled to the one or more contacts and to the housing of the interface component. The terminal-position-assurance feature may be located at a first axial position along the longitudinal axis of the housing. The first axial position is a first distance from the open end face of the housing. An interface seal can surround an outer portion of the housing of the interface component. The interface seal may be located on the housing at a second axial position along the longitudinal axis of the housing. The second axial position is a second distance from the open end face of the housing. The second distance between the interface seal and the open end face of the housing is greater than the first distance between the terminal-position-assurance feature and the open end face of the housing.

In certain examples, the second axial position of the interface seal is closer to the rear end of the housing of the interface component than to the front end of the housing of the interface component; the rear end of the housing of the interface component includes a cable seal and a sealing end cap; the terminal-position-assurance feature is coupled to at least one slot in a side of the housing such that the terminal-position-assurance feature is movable between an unlocked position and a locked position; and/or a portion of the terminal-position-assurance feature is exposed outside of the housing of the interface component;

In other examples, the terminal-position-assurance feature includes at least one position element that has at least one locking arm, the at least one locking arm is configured to engage one of first and second inner notches of the housing, and the second inner notch is located closer to a central axis of the housing than is the first inner notch; the at least one locking arm engages the first inner notch of the housing when the terminal-position-assurance feature is in the unlocked position and the at least one locking arm engages the second inner notch of the housing when the terminal-position-assurance feature is in the unlocked position; the at least one locking arm of the terminal-position-assurance feature engages an outer groove of one of the one or more contacts when the terminal-position-assurance feature is in the locked position; the at least one position element has another locking arm that engages an outer groove of another one of the one or more contacts when the terminal-position-assurance feature is in the locked position; and/or the at least one position element includes a locating lug disposed between the locking arms, the locating lug is configured to extend at least partially between adjacent contacts of the one or more contacts.

In some examples, the outer portion of the housing, which is surrounded by the interface seal, is an outwardly extending flange configured to support the interface seal; the interface seal is a gasket that rests on the flange of the housing of the interface component; a length of the housing of the interface component is between three to four times a width of the housing; the housing is one-piece; and/or a pitch between two adjacent contacts of the one or more contacts is no greater than about 4 mm.

The present disclosure may also relate to a sealed electrical connector that comprises an interface component that includes a housing that defines a longitudinal axis and has a front end and a rear end that is opposite the front end. The front end has an open end face that is configured to receive a mating connector and the rear end is configured to receive one or more cables. The housing comprises one or more contacts. A cable seal may be disposed at a distal opening of the rear end of the housing of the interface component. A sealing end cap may cover a portion of the rear end of the housing of the interface component. The sealing end cap may be configured to compress the cable seal. The sealing end cap may comprise a connector-position-assurance feature and the connector-position-assurance feature is movable between unlocked and locked positions. A latch member extends outwardly from the housing of the interface component. The connector-position-assurance feature engages the latch member when the connector-position-assurance feature is in the locked position. A terminal-position-assurance feature may be coupled to the one or more contacts and to the housing of the interface component. The terminal-position-assurance feature may be located at a first axial position along the longitudinal axis of the housing. The first axial position is a first distance from the open end face of the housing. An interface seal may be located on the housing at a second axial position along the longitudinal axis of the housing. The second axial position is a second distance from the open end face of the housing. The second distance between the interface seal and the open end face of the housing is greater than the first distance between the terminal-position-assurance feature and the open end face of the housing.

In other aspects, the connector-position-assurance feature is configured to slide with respect to the sealing end cap between the unlocked and locked positions; the latch member is a hinge arm and an extension of the connector-position-assurance feature extends under the hinge arm when the connector-position-assurance feature is in the locked position; the housing of the interface component is one-piece; and/or a pitch between two adjacent contacts of the one or more contacts is no greater than about 4 mm.

The present disclosure may further relate to an electrical connector assembly that comprises a first sealed connector couplable with a second connector. The first sealed connector comprises an interface component that includes a housing that defines a longitudinal axis and has a front end and a rear end that is opposite the front end. The front end has an open end face that is configured to receive the second connector and the rear end is configured to receive one or more cables. The one or more contacts are received inside of the housing that connect with corresponding one or more contacts of the second connector. A terminal-position-assurance feature may be coupled to the one or more contacts of the first sealed connector and to the housing of the interface component thereof. The terminal-position-assurance feature may be located at a first axial position along the longitudinal axis of the housing. The first axial position is a first distance from the open end face of the housing. An interface seal may be located on the housing at a second axial position along the longitudinal axis of the housing. The second axial position is a second distance from the open end face of the housing. The second distance between the interface seal and the open end face of the housing is greater than the first distance between the terminal-position-assurance feature and the open end face of the housing. The second connector has a housing with an open end that is configured to receive the front end of the housing of the first sealed connector and the open end extends over the interface seal on the outer portion of the housing of the first sealed connector.

In certain aspects, the first sealed connector is a sealed electrical jack and the second connector is an electrical plug or printed circuit board connector; the second connector includes a cable seal and an extended length sealing end cap configured to compress the cable seal; the extended length of the sealing end cap covers an outer seal disposed on the housing of the second connector; and/or the housing of the second connector includes an expanded portion that receives a latch member of the housing of the first sealed connector This summary is not intended to identify all essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1A:
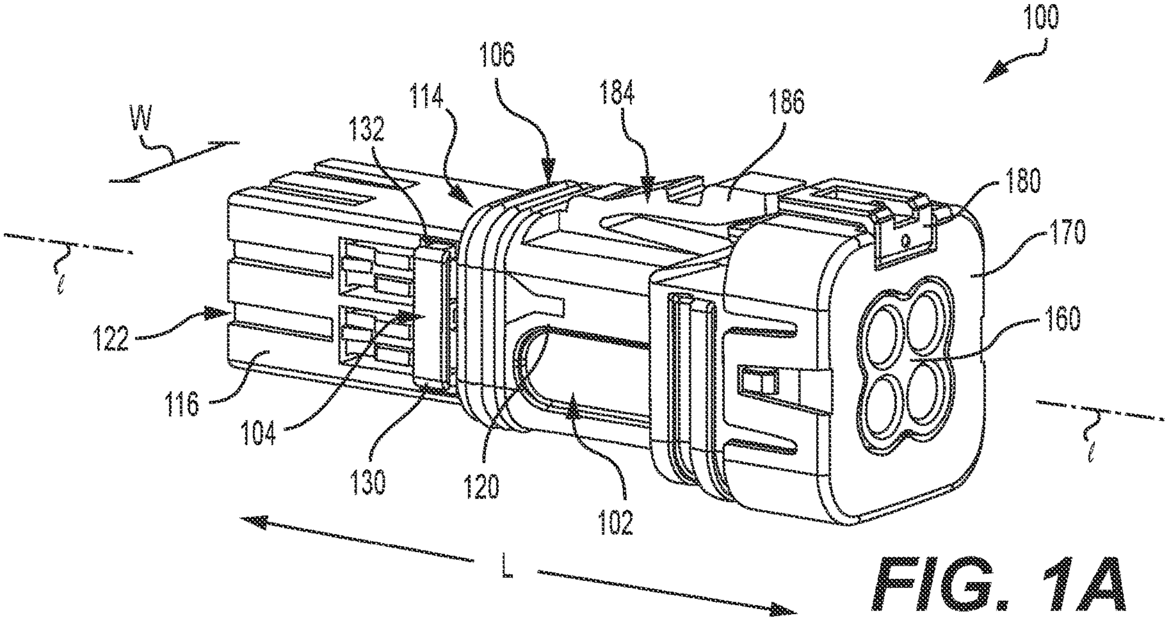
FIG. 1A illustrates a perspective view of a connector according to described examples.

The present disclosure relates to electrical connectors, and electrical connector assemblies, which can be used in high density and high speed RF interconnects, such as in automotive applications. In an example, the electrical connector may be a sealed mini-FAKRA (Fachkreis Automobil) type connector that incorporates both an interface seal and a terminal-position-assurance feature in the electrical connector while minimizing the outer overall diameter (see, for example, diameter *d* in FIG. 2) of the connector, i.e. without substantially increasing the outer diameter in directions orthogonal to the longitudinal axis of the connector. The seal and connector design is oriented such that the overall diameter of the connector is minimized so that the connector can be installed in applications, such as automotive applications, where the installation holes may be of limited diameter. In an example, the outer diameter of the connector can be maintained at about the same diameter or may be slightly greater than the diameter of the commonly used non-sealed mini-FAKRA connectors, thereby providing conformity with current interconnect applications. The sealed connector is also configured to maintain the standard pitch between adjacent electrical contacts of the connector, e.g. at about 4 mm (such as required by the mini-FAKRA standard, e.g. SAE/USCAR specifications for miniature automotive RF connectors) with an acceptable or reasonable tolerance range (for example, 3.90 to 4.10 mm), or smaller than 4 mm. Pitch is defined generally as the distance between the center axis lines of two adjacent contacts (see, for example, pitch P in FIG. 1B). Pitch is more specifically defined in the mini-FAKRA standard (e.g. SAE/USCAR specifications for miniature automotive RF connectors) with respect to the geometric tolerances related to the housing of the mini-FAKRA connector and the true position of each RF contact to within 0.3 mm of the inner walls of the housing mating interface of the mini-FAKRA connector.

The electrical connectors and connector assemblies of the present disclosure may have an interface seal located behind a terminal-position-assurance feature, that is the interface seal is positioned further from the front face of the connector than is the terminal-position-assurance feature of the connector in order to seal the cable or rear end of the connector. The electrical connector may have a compact diameter in directions orthogonal to the longitudinal axis of the electrical connector which allows the connector to pass through holes that may be of a limited diameter, such as holes in an automobile panel or chassis, while also providing environmental sealing, such as IP68 or IP69k rated sealing. The electrical connector may also incorporate one or more terminal-position-assurance features which allow for easy connector rework, repair or service. The electrical connector may include non-sealed RF contacts for commonality with current interconnect systems, convenience, and reduced cost. The electrical connector may have an elongated length interface that is longer than or extended compared with the length of the current non-sealed mini-FAKRA connectors to provide additional room for the interface seal.

Figure 1B:
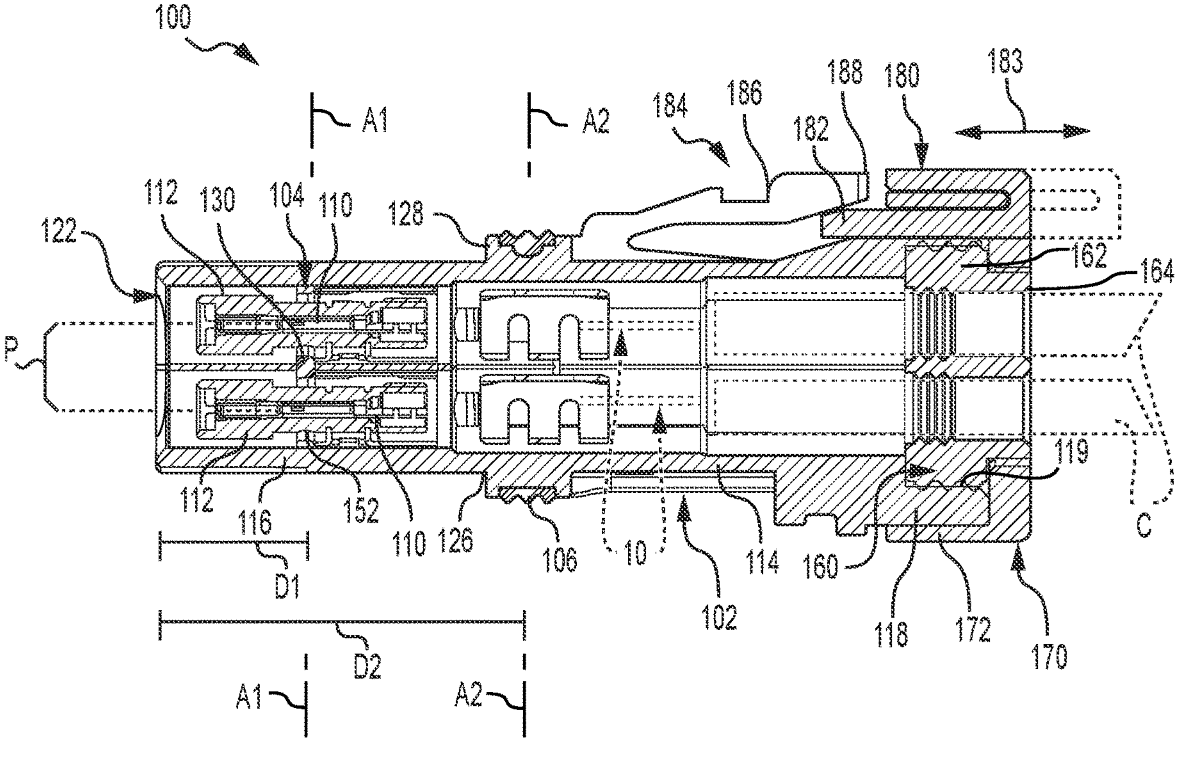
FIG. 1B illustrates a side view in cross-section of the connector illustrated in FIG. 1A.

In an aspect of the present disclosure, a sealed electrical connector 100 includes an interface component 102, a terminal-position-assurance feature 104, and an interface seal 106. FIG. 1A shows an example connector 100 in a perspective view and FIG. 1B shows the connector 100 in cross-section. The sealed electrical connector 100 may be, for example, a cable connector, such as an electrical jack, with one or more contacts 110 that terminate to one or more conductors 10 of one or more cables C. In an example, each contact 110 may be a contact member similar to the contact member described in commonly owned U.S. Pat. No. 10,992,087 entitled Contact Member For Electrical Connector, the subject matter of which is herein incorporated by reference in its entirety. Each contact 110 may have a socket end 112 that is configured to engage a mating pin of the mating connector 200, 300.

Figure 4:
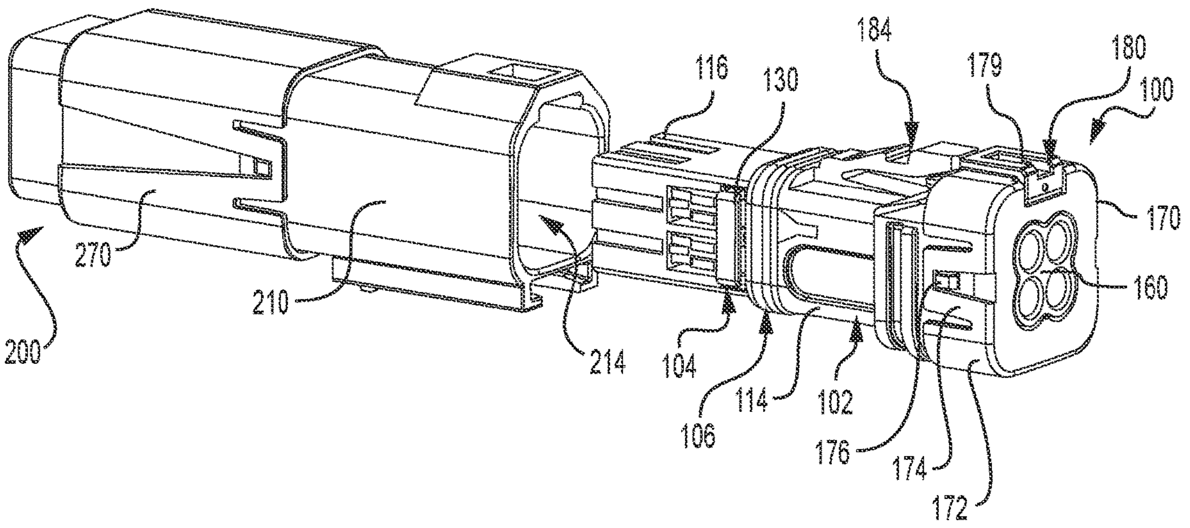
FIGS. 4 and 5 are exploded perspective views of an electrical connector assembly according to described examples, showing the connector illustrated in FIG. 1A mated with a mating connector.
Figure 7:
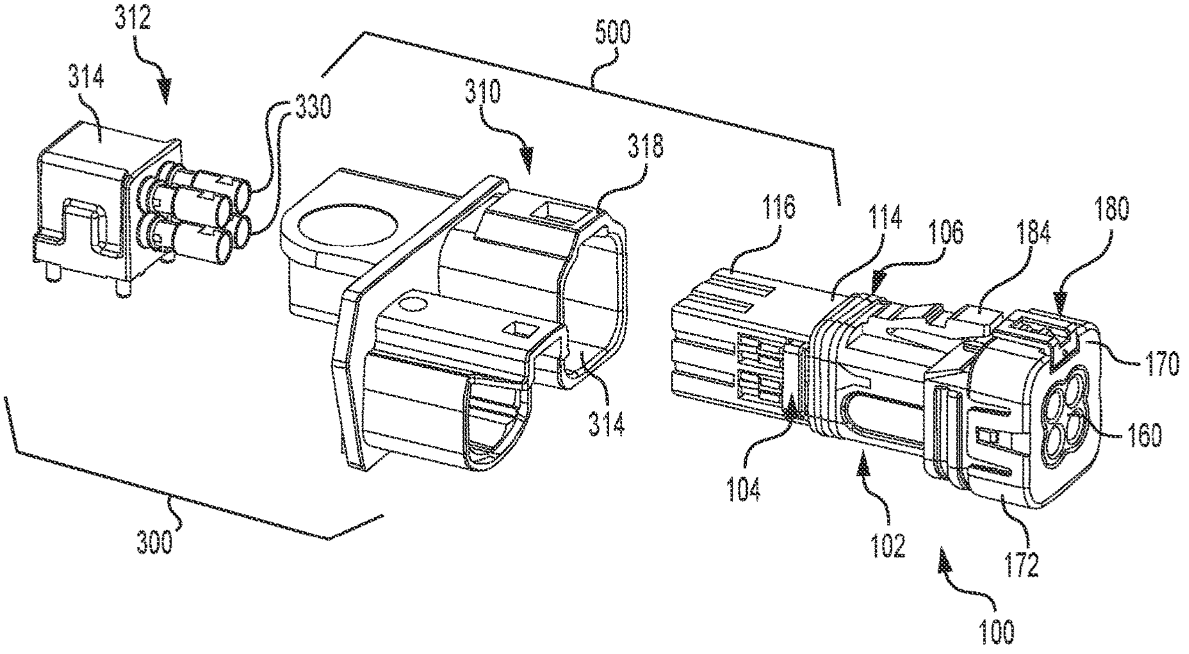
FIG. 7 is an exploded perspective view of another electrical connector assembly according to described examples, showing the connector illustrated in FIG. 1A mated with another mating connector.

The interface component 102 of the connector 100 has a housing 114 that defines a longitudinal axis $\ell$ and has a front end 116 and a rear end 118 that is opposite the front end 116, and longitudinal sides 120 that extend between the first and rear ends 116 and 118. The front end 116 has an open end face 122 that is configured to receive a mating connector 200, 300 (FIGS. 4 and 7). The rear end 118 is configured to receive the one or more cables C. The contacts 110 are received inside of the housing 114. The conductors 10 of cable C are each terminated to one of the contacts 110.

The housing 114 supports both the terminal-position-assurance feature 104 and interface seal 106 along the longitudinal axis $\ell$ of the housing 114 to enable environmental sealing for the connector 100 without substantially increasing the diameter $d$ (FIG. 2) of the connector 100 or increasing the pitch P (FIG. 1B) between adjacent contacts 110 inside the housing 114. The diameter $d$ of the connector 100 is minimized to provide a compact diameter in directions orthogonal to the longitudinal axis $\ell$ which allows the connector 100 to pass through holes that may be of a limited diameter, such as holes in an automobile panel or chassis, while also providing environmental sealing, such as IP68 or IP69k rated sealing. In an example, the diameter $d$ can be 21 mm or within a reasonable tolerance range of about 21 mm. The foregoing sentence includes example dimensions, and the diameter $d$ can be other sizes in other examples.

In an example, a length L of the housing 114 can be elongated, as compared to the length of a typical non-sealed mini-FAKRA connector, to accommodate both the terminal-position-assurance feature 104 and the interface seal 106. The length L of the housing 114 can be, for example, about three to four times greater than the width W of the housing 114, as seen in FIG. 1A. In an example, the length L of the housing 114 can be about 40 to 55 mm and the width W of the housing 114 can be about 9.9 mm to 10.8 mm. The housing 114 can be formed as one-piece or multiple pieces. The housing 114 can be formed of a non-conductive material, such as a thermoplastic material, and can be formed by injection molding. The foregoing are example dimensions, and the housing 114 may have other dimensions for length L and width W in other examples.

Figure 2:
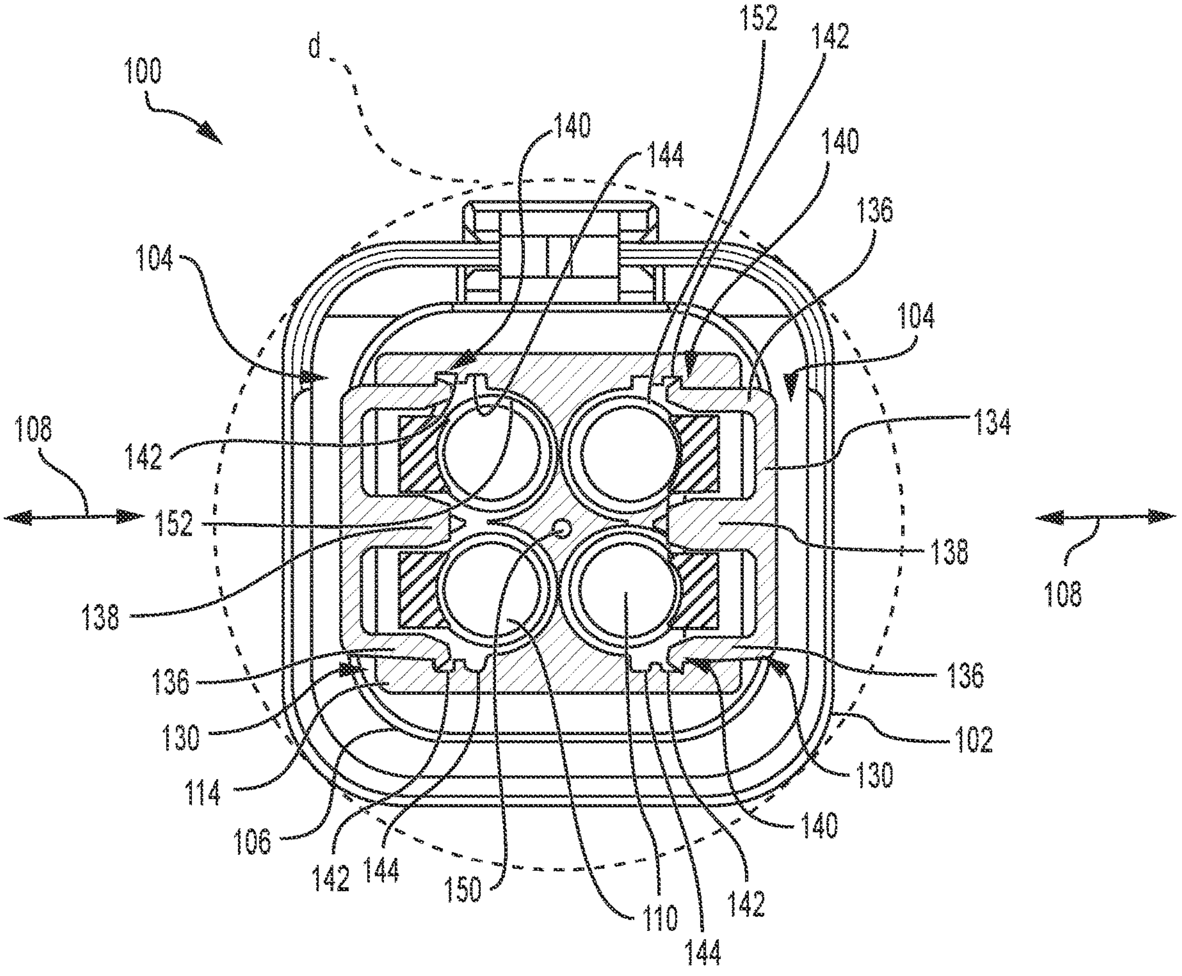
FIG. 2 is an end view in cross-section of the connector illustrated in FIG. 1A.
Figure 3:
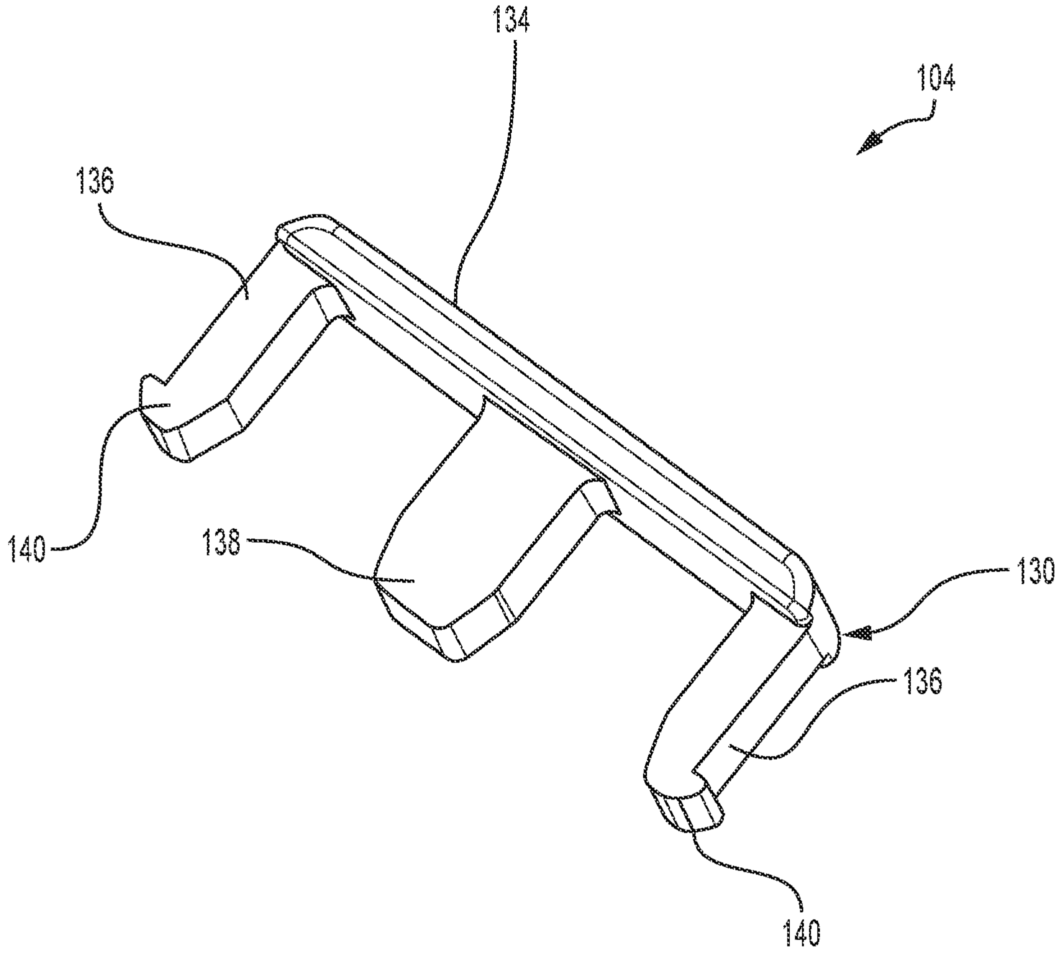
FIG. 3 is a perspective view of a terminal-position-assurance feature of the connector in FIG. 2.

FIG. 2 is a cross-sectional end view of the connector 100 showing the terminal-position-assurance feature 104 coupled to the housing 114 of the interface component 102; and FIG. 3 is a perspective view of a position element 130 of the terminal-position-assurance feature 104. The terminal-position-assurance feature 104 is configured to couple to the contacts 110 that are inside of the housing 114, is configured to couple to the housing 114 itself, or is configured to couple to both the contacts 110 and the housing 114. When the terminal-position-assurance feature 104 is coupled to the contacts 110, the housing 114, or to both the contacts 110 and the housing 114, the terminal-position-assurance feature 104 can move in an outwardly direction and an inwardly direction (see arrows 108 shown in FIG. 2), with respect to the central axis 150 of the connector, between an unlocked position and a locked position, respectively. The terminal-position-assurance feature 104 is designed to provide positive engagement of the contacts 110 in the housing 114 with guaranteed position and high retention force to resist axial and lateral movement of the contacts 110 within the connector 100. The terminal-position-assurance feature 104 and the position elements 130 thereof, retain the contacts 110 in the housing 114 at the correct position which positions inner and outer contacts of the contacts 110 in the correct range relative to the mating interface of the housing 114. The axial positions of the contacts 110 and ranges are defined by the USCAR standard, for example. In addition, the position elements 130 of the terminal-position-assurance feature 104 can be disengaged from the contacts 110, the housing 114, or the contacts 110 and the housing 114 to rework or replace the connector.

The connector 100 is configured such that the terminal-position-assurance feature 104 can be positioned at a first axial position A1 that is in front of the interface seal 106. The interface seal 106 may be positioned at a second axial position A2 behind the terminal-position-assurance feature 104. That is, the terminal-position-assurance feature 104 is positioned closer to the front end 116 of the housing 114 than is the interface seal 106, as seen in FIG. 1B. Likewise, the interface seal 106 is positioned closer to the rear end 118 of the housing 114 than is the terminal-position-assurance feature 104. This arrangement allows the interface seal 106 to provide environmental sealing to the connector 100, and the connector assemblies 400 and 500 (FIGS. 6 and 8), even if there is a leak at the terminal-position-assurance feature 104. The first axial position A1 of the terminal-position-assurance feature 104 is located along the longitudinal axis $\ell$ of the housing 114, where the first axial position A1 is at a first distance D1 from the open end face 122 of the housing 114.

The terminal-position-assurance feature 104 includes one or more position elements 130 (FIG. 3). Each position element 130 can be inserted into the sides 120 of the housing 114, as seen in FIG. 2, in order to engage the individual contacts 110. Each position element 130 is coupled to the housing 114 by insertion into a slot 132 (FIG. 1A) in each side 120 such that a portion 134 of each position element 130 is accessible through the slot 132 or is exposed, that is the portion 134 of the position element 130 remains outside of the housing 114. Each position element 130 is coupled to the sides 120 of the housing 114 such that each position element 130 is movable inwardly and outwardly with respect to the central axis 150 of the housing 114 between the unlocked or shipping position (shown in FIG. 2) and the locked position in which the contacts 110 are locked in place.

Each position element 130 includes two locking arms 136 located at the distal ends of the exposed portion 134 with a locating lug 138 disposed between the two locking arms 136. Each position element 130 can be formed as one-piece and can be made of plastic, although in some instances the position elements 130 can be formed of more than one piece and may also be formed other materials besides plastic. The locking arms 136 and the locating lug 138 extend generally perpendicularly from the exposed portion 134 of the position element 130 and inwardly into the connector 100 when the position elements 130 are coupled to the housing 114. The locating lug 138 is designed to extend at least partially between adjacent contacts 110 to assist with proper locating of the position element 130 with respect to the contacts 110. In an example, the connector 100 includes four contacts 110 and the terminal-position-assurance feature 104 includes two position elements 130, where each position element 130 retains two adjacent contacts 110.

Each locking arm 136 has a catch 140 at its distal end. Each catch 140 of each locking arm 136 is designed to engage a first inner notch 142 or a second inner notch 144 formed on the inside of the housing 114, as best seen in FIG. 2. The housing 114 can include pairs of the first and second inner notches 142 and 144 where each pair corresponds to each locking arm 136 of each position element 130. The second inner notch 144 of each pair is located closer to the central axis 150 of the housing 114 than is the first inner notch 142. The first inner notch 142 represents the unlocked position of each position element 130 of the terminal-position-assurance feature 104 and the second inner notch 144 represents the locked position of each position element 130. That is, when the catch 140 of each position element 130 engages a respective first inner notch 142, the position element 130 and the terminal-position-assurance feature 104 is in the unlocked position. From the unlocked position, each position element 130 can be pushed inwardly until the catches 140 disengage from their respective first inner notches 142 and subsequently engage a respective second inner notice 144. And when the catch 140 of each position element 130 engages their respective second inner notch 142, the position elements 130 and the terminal-position-assurance feature 104 are in the locked position. In the locked position, the locking arms 136 of each position element 130 also engage a respective outer groove 152 of each contact 110 for positive engagement and positioning of the contacts 110. The position elements 130 may be disengaged from the outer grooves 152 of the contacts and from the housing 114 to rework the connector 100 or replace a contact 110.

The interface seal 106 surrounds an outer portion 126 of the housing 114 of the interface component 102. In some examples, the interface seal 106 does not completely surround the outer portion 126 of the housing 114. In an example, the outer portion 126 is an outwardly extending flange 128 that is shaped and sized to accommodate the interface seal 106. The interface seal 106 can be, for example, a gasket that is rubber or plastic. Alternatively, the interface seal 106 could be formed integrally with the outer portion 126 of the housing 114. For example, the flange 128 could include wipers or protrusions that acts as seals. The interface seal 106 is located on the housing 114 at a second axial position A2 along the longitudinal axis $\ell$ of the housing 114 that is behind the first axial position A1 of the terminal-position-assurance feature 104, that is position A2 is further away from the front end 116 than is the position A1. The second axial position A2 is at a second distance D2 from the open end face 122 of the housing 114. The second axial position A2 of the interface seal 106 can be closer to the rear end 118 of the housing 114 of the interface component 102 than to the front end 116 of the housing 114. As seen in FIG. 1B, the second distance D2 is greater than the first distance D1 (as discussed above, the terminal-position-assurance feature 104 may be located at first axial position A1). Positioning the interface seal 106 behind the terminal-position-assurance feature 104 avoids the problem of a possible leakage path that could be formed by the position elements 130 of the terminal-position-assurance feature 104 extending through the sides 120 of the housing 114.

Figure 5:
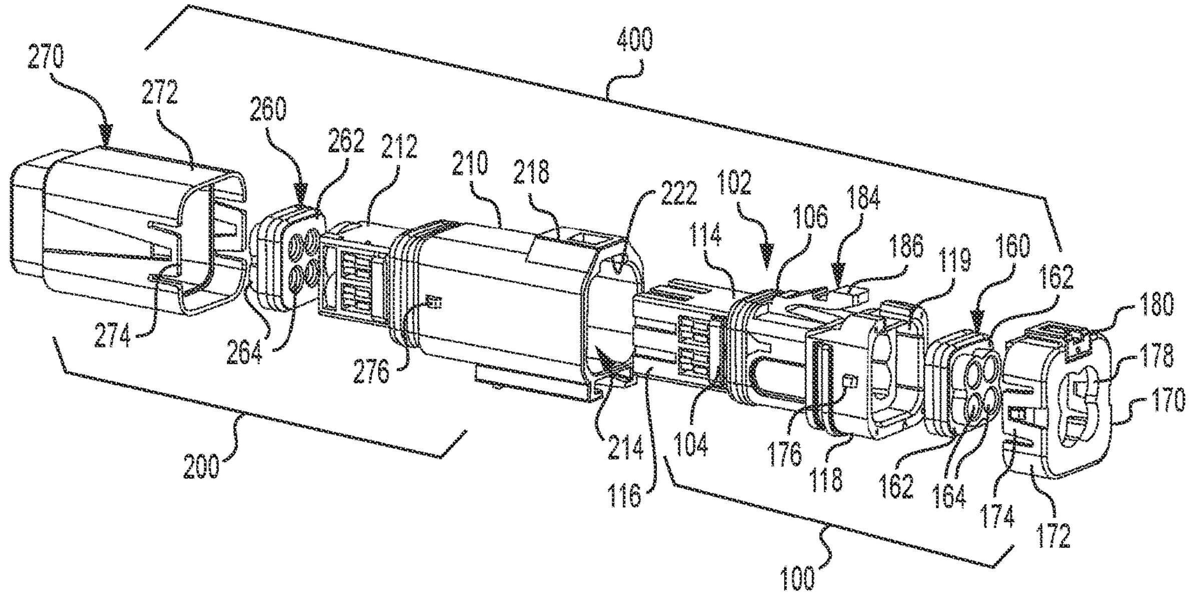

The connector 100 also comprises a cable seal 160 and a sealing end cap 170, as best seen in FIGS. 1A, 1B, and 5. The cable seal 160 is configured to seal and isolate the inner space of the interface component 102 from the environment outside of the connector 100. The cable seal 160 has a seal body 162 with passageways 164. The seal body 162 is shaped to fit into a distal opening 119 at the rear end 118 of the housing 114 in a seal tight manner, for example, making a seal between the rear end 118 of the housing 114 and the cable seal 160 that meets the IP68 or IP69k standard, for example. Each passageway 164 of the cable seal 160 is configured to receive one of the cables C in a sealing and tight fit.

The sealing end cap 170 is designed to hold and compress the cable seal 160 at the rear end 118 of the housing 114 to further seal the inner space of the interface component 102. The sealing end cap 170 has a shoulder 172 that surrounds a portion of the rear end 118 of the housing 114. The shoulder 172 can be coupled to the rear end 118 by an engagement feature 174 (FIGS. 4 and 5), such as a snap arm, a spring tab, or the like, that can engage a corresponding detent 176 on the outside of the housing 114. The sealing end cap 170 has a cable opening 178 that allows the cables C to pass therethrough when the end cap 170 is coupled to the rear end 118 of the housing 114. One cable opening 178 is illustrated but the sealing end cap 170 may have more than one opening (e.g., one opening for each cable C, one opening for each pair of cables C, etc.).

Figure 6:
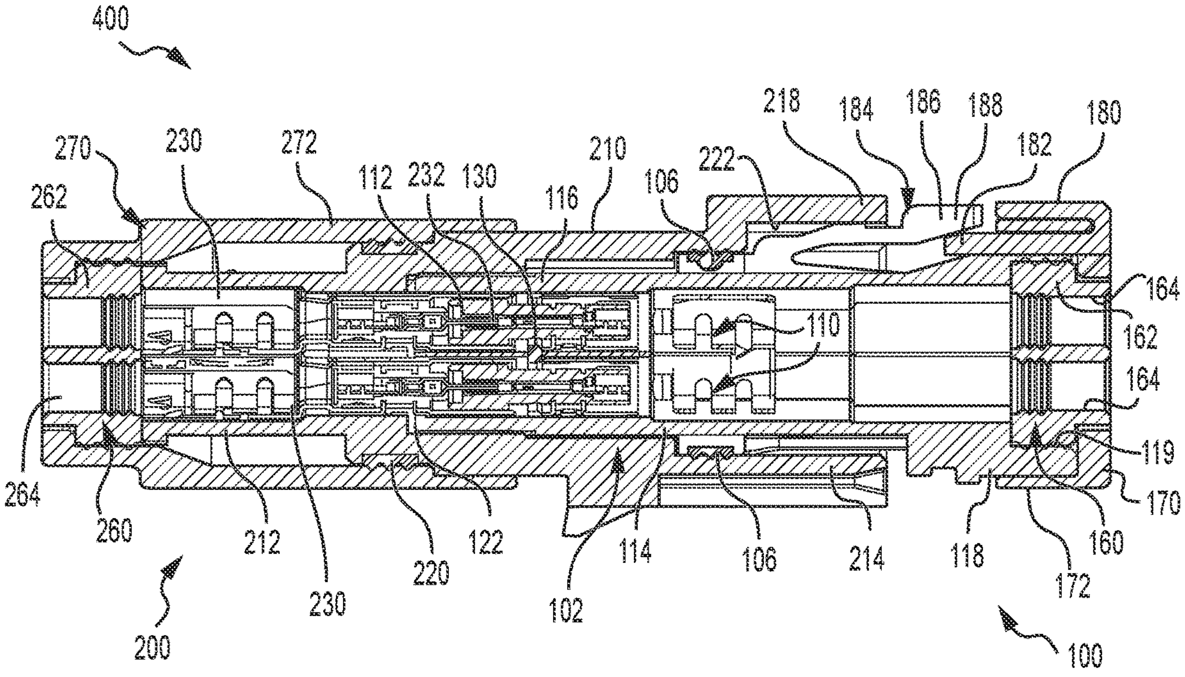
FIG. 6 is a side view in cross-section of the connector assembly illustrated in FIGS. 4 and 5.
Figure 8:
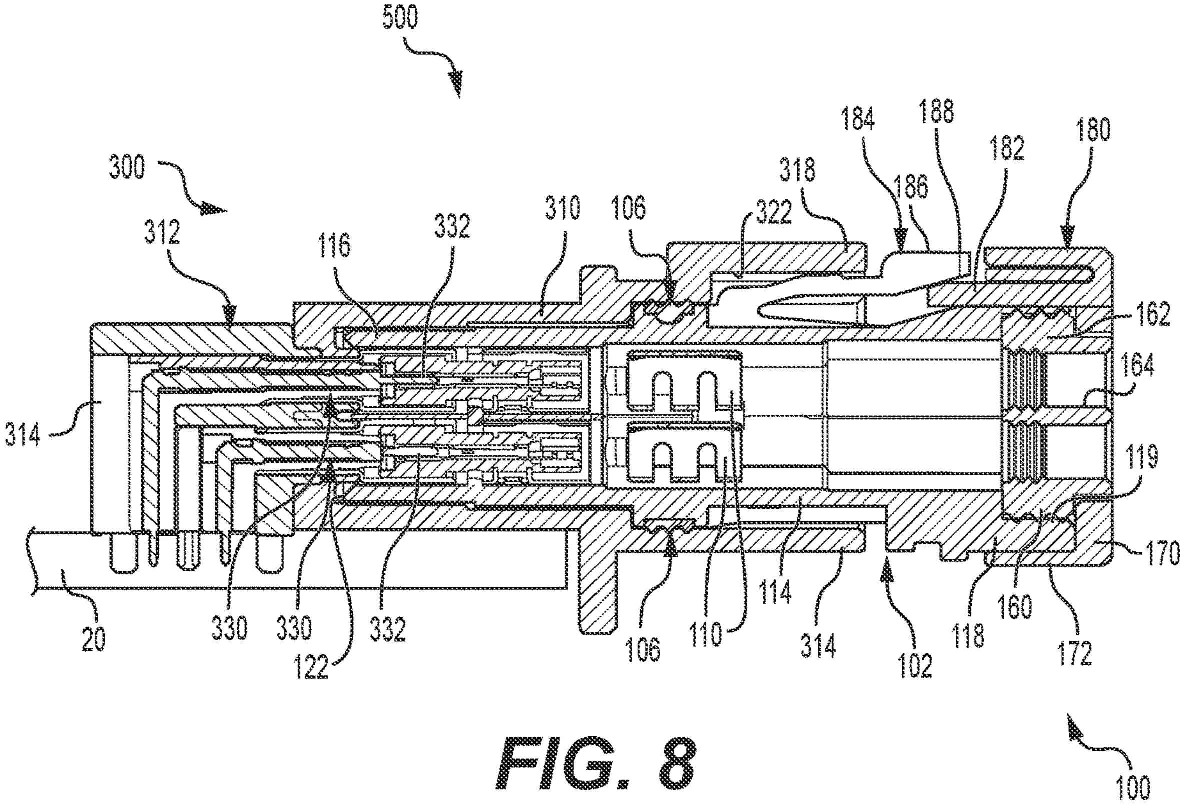
FIG. 8 is a side view in cross-section of the connector assembly illustrated in FIG. 7.

Incorporated into the sealing end cap 170 is a connector-position-assurance feature 180. The connector-position-assurance feature 180 is configured to ensure that the connector 100 and its mating connector 200 or 300 do not accidentally disengage from each other. The connector-position-assurance feature 180 may be, for example, removably integrated into the sealing end cap 170. The connector-position-assurance feature 180 can be slidably coupled to the shoulder 172 such that the connector-position-assurance feature 180 can move axially, in a direction generally parallel to the longitudinal axis $\ell$ (see arrow 183 in FIG. 1B), between an unlocked or shipping position, and a locked position, in which the connector 100 positively locks to the mating connector 200 or 300, as seen in FIGS. 6 and 8. Referring to FIG. 1B, the unlocked or shipping position of the connector-position-assurance feature 180 is illustrated with dashed lines and the locked position of the connector-position-assurance feature 180 is illustrated with solid lines.

The sealing end cap 170 may have one or more protrusions 179 which can engage the connector-position-assurance feature 180 and allow a user to click the connector-position-assurance feature 180 into a forward lock position from a backward unlock position, as seen in FIG. 1B. The connector-position-assurance feature 180 has an extension 182 that cooperates with a latch member 184 of the housing 114. The latch member 184 includes a hinge arm 186. When the extension 182 of the connector-position-assurance feature 180 is moved toward the front end 116 of the housing 114 (i.e., from the unlocked position into the locked position), the extension 182 engages under a free end 188 of the hinge arm 186 of the latch member 184, as seen in FIG. 1B. This in turn forces the latch member 184 into latching engagement with the mating connector 200 (FIG. 6) or the mating connector 300 (FIG. 8) for positive locking of the connector 100 with the mating connector 200 or 300. The connector-position-assurance feature 180 can be disengaged after the latch member 184 latches with the mating connector 200.

FIGS. 4 and 5 illustrate an electrical connector assembly 400 that includes the connector 100 and the mating connector 200. FIG. 6 shows a cross-section of the assembly 400 with the connector 100 and the mating connector 200 mated together. The mating connector 200 may be, for example, an electrical plug connector that is configured to mate with the connector 100, which may be an electrical jack connector, for example. The connector 200 can include a housing 210, one or more contacts 230 (FIG. 6) inside the housing 210 that couple and terminate to cables, an outer seal 220 on an outer portion of the housing 210, at least one cable seal 260, and an extended sealing end cap 270 that has an elongated length 272. The cable seal 260 is similar to the cable seal 160 of the connector 100. The cable seal 260 has a seal body 262 with passageways 264. The seal body 262 is shaped to fit into a cable end 212 of the housing 210 in a seal tight manner, for example, making a seal between the housing 210 and the cable seal 160 that meets the IP68 or IP69k standard, for example. Each passageway 264 of the cable seal 260 is configured to receive one more cables in a sealing and tight fit.

The housing 210 has the cable end 212 and an opposing front end 214. The cable end 212 receives the cables and the front end 214 is open to receive the front end 116 of the housing 114 of the connector 100. The sealing end cap 270 is configured to hold and compress the cable seal 260 at the cable end 212. The elongated length 272 of the extended sealing end cap 270 allows the end cap 270 to extend over the cable end 212 and cover the housing 210 past the outer seal 220 toward the front end 214 of the housing 210, as seen in FIG. 6. Extended sealing end cap 270 can include an engagement feature 274, such as a snap arm, that can snap over a corresponding detent 276 on the outside of the housing 210. By covering the outer seal 220, the extended sealing end cap 270 compressing the outer seal 220 to provide environmental sealing to the connector 200. That is, the mating connector 200 and the extended sealing end cap 270 thereof are configured such that the interface seal 106 on the outer portion 126 of the housing 114 of the connector 100 is within the open end 214 of the mating connector 200 when the connector 100 and the mating connector 200 are coupled.

The front end 214 of the housing 210 can have an expanded portion 218 designed to engage the latch member 184 of the connector 100. The expanded portion 218 creates an inner cavity 222 that is sized to receive and compress the hinge arm 186 of the latch member 184 when the connector 100 is positively engaged with the mating connector 200, as seen in FIG. 6. The extension 182 of the connector-position-assurance feature 180 of the connector 100 can extend under the free end 188 of the hinge arm 186 to prevent disengagement of the latch arm 184 of the connector 100 from the mating connector 200.

Each contact 230 can include a pin 232 for mating to a socket of a mating connector, such as the socket end 112 one of the contacts 110 of the connector 100. The terminal-position-assurance feature 240 is similar to the terminal-position-assurance feature 104 of the connector 100. The terminal-position-assurance feature 240 may be removably inserted or engaged in the housing 210 and may match with a grooves 234 of each the contact 230, so as to lock the contacts 230 in place in the housing 210.

When the connectors 100 and 200 are mated to form the assembly 400, the socket ends 112 of the contacts 110 receive the pins 232 of the contacts 230, thereby electrically coupling the connectors 100 and 200. The front end 116 of the housing 114 of the connector 100 is inserted through the open front end 214 of the mating connector 200 such that the front end 214 covers the front end 116 of the connector 100 and covers the interface seal 106 of the connector 100. This seals the interconnect between the connectors 100 and 200, such that the interface seal 106 can prevent water from leaking into the connectors 100 and 200 and from disturbing the normal operation of the connectors 100 and 200.

The hinge arm 186 of the latch member 184 of the connector 100 squeezes into the cavity 222 of the expanded portion 218 of the housing 210 at the front end 214 of the mating connector 200. The spring nature of the hinge arm 186 allows the hinge arm 186 to bend/compress when inserted into the cavity 222. With the connector-position-assurance feature 180 in the unlock position, the hinge arm 186 is allowed to flex freely. After the latch member 184 of the connector 100 is engaged with the expansion portion 218 of the mating connector 200, the connector-position-assurance feature 180 can be pushed forward toward the mating connector 200 such that the extension 182 engages under the free end 188 of the hinge arm 186 to prevent the latch member 184 from disengaging from the expansion portion 218, thereby preventing accidental unmating of the connectors 100 and 200 of the assembly 400.

FIG. 7 illustrates another electrical connector assembly 500 that includes the connector 100 and another mating connector 300. FIG. 8 shows a cross-section of the assembly 500 with the connector 100 and the mating connector 300 mated together. The mating connector 300 may be, for example, an electrical or printed circuit board (PCB) connector. The mating connector 300 includes a module housing 310 that supports a contact system 312. The contact system 312 is configured to engage a printed circuit board 20. The contact system 312 has a shell 314 with a plurality of contacts 330 supported therein. Each contact 330 may have a pin 332 that mates with a corresponding socket 112 of the contacts 110 of the connector 100. In an example, the contact system 312 and the contacts 330 may be a mini-FAKRA type contact system 312 where the pitch between the contacts 330 is about 4 mm. Because the pitch P of the contacts 110 of the connector 100 can be maintained at about 4 mm or within a reasonable tolerance range thereof (and not greater than about 4 mm), no retooling of the connector 100 is required in order to accommodate and connect to the contact system 312 of the mating connector 300. In other examples, for example if the application calls for a different pitch P between the contacts 110, the pitch P can be greater or smaller than 4 mm.

The housing module 310 has an open front end 314 that is configured to receive the front end 116 of the housing 114 of the connector 100 such that the open front end 314 covers the interface seal 106 of the interface component 102. The open front end 314 of the housing module 310 of the mating connector 300 can have an expanded portion 318 that creates an inner cavity 322 that receives the hinge arm 186 of the latch member 184 of the connector 100 when the connectors 100 and 300 are mated together to form the assembly 500.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as front, rear, forward, backward. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. A sealed electrical connector, comprising:

an interface component including a housing that defines a longitudinal axis and has a front end and a rear end that is opposite the front end, the front end having an open end face being configured to receive a mating connector and the rear end being configured to receive one or more cables, wherein the housing comprises one or more contacts;

a terminal-position-assurance feature coupled to the one or more contacts and to the housing of the interface component, the terminal-position-assurance feature located at a first axial position along the longitudinal axis of the housing, wherein the first axial position is a first distance from the open end face of the housing; and an interface seal surrounding an outer portion of the housing of the interface component, the interface seal located on the housing at a second axial position along the longitudinal axis of the housing, wherein the second axial position is a second distance from the open end face of the housing, wherein the second distance between the interface seal and the open end face of the housing is greater than the first distance between the terminal-position-assurance feature and the open end face of the housing.

2. The connector of claim 1, wherein the second axial position of the interface seal is closer to the rear end of the housing of the interface component than to the front end of the housing of the interface component.

3. The connector of claim 1, wherein the rear end of the housing of the interface component includes a cable seal and a sealing end cap.

4. The connector of claim 1, wherein a pitch between two adjacent contacts of the one or more contacts is no greater than about 4 mm.

5. The connector of claim 1, wherein the terminal-position-assurance feature is coupled to at least one slot in a side of the housing such that the terminal-position-assurance feature is movable between an unlocked position and a locked position.

6. The connector of claim 5, wherein a portion of the terminal-position-assurance feature is exposed outside of the housing of the interface component.

7. The connector of claim 5, wherein the terminal-position-assurance feature includes at least one position element that has at least one locking arm, the at least one locking arm is configured to engage one of first and second inner notches of the housing, and the second inner notch is located closer to a central axis of the housing than is the first inner notch.

8. The connector of claim 7, wherein the at least one locking arm engages the first inner notch of the housing when the terminal-position-assurance feature is in the unlocked position and the at least one locking arm engages the second inner notch of the housing when the terminal-position-assurance feature is in the unlocked position.

9. The connector of claim 7, wherein the at least one locking arm of the terminal-position-assurance feature engages an outer groove of one of the one or more contacts when the terminal-position-assurance feature is in the locked position.

10. The connector of claim 9, wherein the at least one position element has another locking arm that engages an outer groove of another one of the one or more contacts when the terminal-position-assurance feature is in the locked position.

11. The connector of claim 10, wherein the at least one position element includes a locating lug disposed between the locking arms, the locating lug is configured to extend at least partially between adjacent contacts of the one or more contacts.

12. The connector of claim 1, wherein the outer portion of the housing, which is surrounded by the interface seal, is an outwardly extending flange configured to support the interface seal.

13. The connector of claim 12, wherein the interface seal is a gasket that rests on the flange of the housing of the interface component.

14. The connector of claim 1, wherein a length of the housing of the interface component is between three to four times a width of the housing.

15. The connector of claim 14, wherein the housing is one-piece.

16. A sealed electrical connector, comprising:

an interface component including a housing that defines a longitudinal axis and has a front end and a rear end that is opposite the front end, the front end having an open end face being configured to receive a mating connector and the rear end being configured to receive one or more cables, wherein the housing comprises one or more contacts;

a cable seal disposed at a distal opening of the rear end of the housing of the interface component;

a sealing end cap covering a portion of the rear end of the housing of the interface component, and the sealing end cap being configured to compress the cable seal, wherein the sealing end cap comprises a connector-position-assurance feature, and wherein the connector-position-assurance feature is movable between unlocked and locked positions;

a latch member extending outwardly from the housing of the interface component, wherein the connector-position-assurance feature engages the latch member when the connector-position-assurance feature is in the locked position;

a terminal-position-assurance feature coupled to the one or more contacts and to the housing of the interface component, the terminal-position-assurance feature being located at a first axial position along the longitudinal axis of the housing, wherein the first axial position is a first distance from the open end face of the housing; and an interface seal located on the housing at a second axial position along the longitudinal axis of the housing, wherein the second axial position is a second distance from the open end face of the housing, wherein the second distance between the interface seal and the open end face of the housing is greater than the first distance between the terminal-position-assurance feature and the open end face of the housing.

17. The connector of claim 16, wherein the connector-position-assurance feature is configured to slide with respect to the sealing end cap between the unlocked and locked positions.

18. The connector of claim 16, wherein the latch member is a hinge arm and an extension of the connector-position-assurance feature extends under the hinge arm when the connector-position-assurance feature is in the locked position.

19. The connector of claim 16, wherein the housing of the interface component is one-piece.

20. The connector of claim 16, wherein a pitch between two adjacent contacts of the one or more contacts is no greater than about 4 mm.

21. An electrical connector assembly, comprising:

a first sealed connector couplable with a second connector, the first sealed connector comprising, an interface component including a housing that defines a longitudinal axis and has a front end and a rear end that is opposite the front end, the front end having an open end face being configured to receive the second connector and the rear end being configured to receive one or more cables, wherein one or more contacts are received inside of the housing that connect with corresponding one or more contacts of the second connector, a terminal-position-assurance feature coupled to the one or more contacts of the first sealed connector and to the housing of the interface component thereof, the terminal-position-assurance feature being located at a first axial position along the longitudinal axis of the housing, wherein the first axial position is a first distance from the open end face of the housing, and an interface seal located on the housing at a second axial position along the longitudinal axis of the housing, wherein the second axial position is a second distance from the open end face of the housing, wherein the second distance between the interface seal and the open end face of the housing is greater than the first distance between the terminal-position-assurance feature and the open end face of the housing, wherein the second connector has a housing with an open end that is configured to receive the front end of the housing of the first sealed connector and the open end extends over the interface seal on the outer portion of the housing of the first sealed connector, and wherein the second connector includes a cable seal and an extended length sealing end cap configured to compress the cable seal.

22. The connector assembly of claim 21, wherein the first sealed connector is a sealed electrical jack and the second connector is an electrical plug or printed circuit board connector.

23. The connector assembly of claim 21, wherein the extended length of the sealing end cap covers an outer seal disposed on the housing of the second connector.

24. The connector assembly of claim 21, wherein the housing of the second connector includes an expanded portion that receives a latch member of the housing of the first sealed connector.

25. An electrical connector assembly, comprising:

a first sealed connector couplable with a second connector, the first sealed connector comprising, an interface component including a housing that defines a longitudinal axis and has a front end and a rear end that is opposite the front end, the front end having an open end face being configured to receive the second connector and the rear end being configured to receive one or more cables, wherein one or more contacts are received inside of the housing that connect with corresponding one or more contacts of the second connector, a terminal-position-assurance feature coupled to the one or more contacts of the first sealed connector and to the housing of the interface component thereof, the terminal-position-assurance feature being located at a first axial position along the longitudinal axis of the housing, wherein the first axial position is a first distance from the open end face of the housing, and an interface seal located on the housing at a second axial position along the longitudinal axis of the housing, wherein the second axial position is a second distance from the open end face of the housing, wherein the second distance between the interface seal and the open end face of the housing is greater than the first distance between the terminal-position-assurance feature and the open end face of the housing, wherein the second connector has a housing with an open end that is configured to receive the front end of the housing of the first sealed connector and the open end extends over the interface seal on the outer portion of the housing of the first sealed connector, and wherein the housing of the second connector includes an expanded portion that receives a latch member of the housing of the first sealed connector.

* * * * *